Oct. 23, 1951  E. D. McCULLOUGH  2,572,171
ADJUSTABLE GATE
Filed June 24, 1947
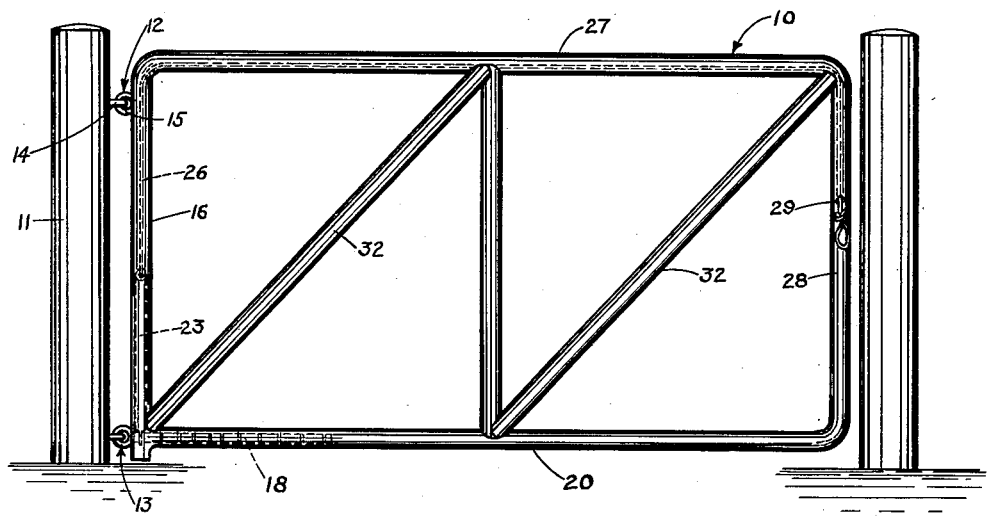
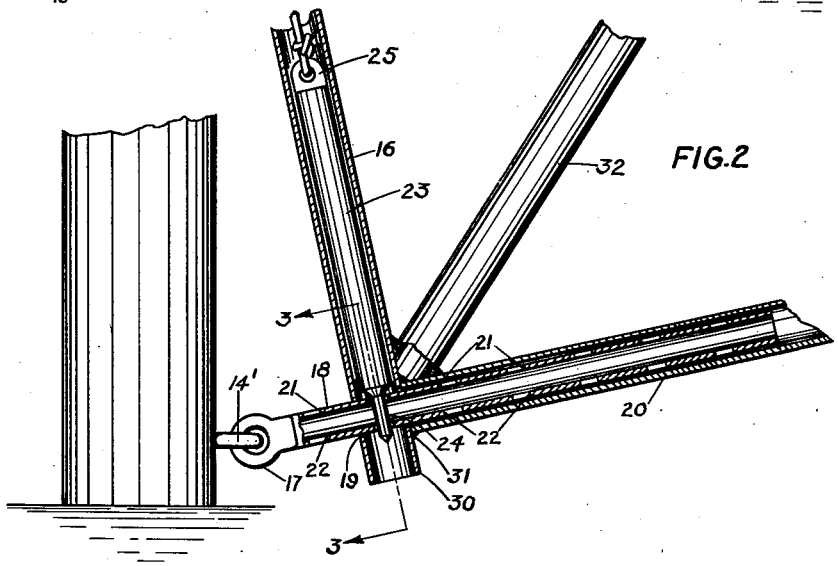
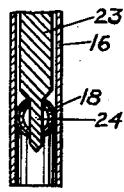
Inventor
ELI D. MC CULLOUGH
By McMorrow, Berman + Davidson
Attorneys Patented Oct. 23, 1951

2,572,171

UNITED STATES PATENT OFFICE 2,572,171

ADJUSTABLE GATE

Eli D. McCullough, Kansas City, Mo.

Application June 24, 1947, Serial No. 756,728

3 Claims. (Cl. 39—87)

This invention relates to gates of the type which are supported to swing horizontally and which are also mounted in a manner to permit the elevation of the unsupported end thereof.

Gates of the type to which the invention relates are particularly adapted for use as farm gates and the like, and are provided with means for elevating the unsupported end thereof in order to compensate the sagging of the gate toward the unsupported end, and for other reasons such as permitting the end of the gate to be lifted clear of snow drifts or other obstructions, or to permit small animals to pass underneath while preventing larger animals from passing.

Heretofore such constructions have involved adjusting structures which deteriorate rapidly, being exposed to the weather, and present an unsightly appearance.

It is among the objects of the present invention to provide a gate of the type described, in which the means for adjusting the gate to a desired elevation is enclosed in the frame of the gate thus avoiding exposure to weather and presenting a better appearance.

A further object of the invention resides in the provision of improved means for effecting the adjustment of the gate which means will be rigid and durable, which will hold the gate securely in the adjusted position, and which may be manipulated from the swinging or unsupported end thereof.

The foregoing and other objects and features of the invention will be made fully apparent to those skilled in the art from a consideration of the following detailed description taken in conjunction with the accompanying drawing, in which:

Figure 1 shows in front elevation a gate constructed in accordance with the invention.

Figure 2 is an enlarged fragmentary section of a portion of the gate with parts shown in side elevation.

Figure 3 is a section taken on line 3—3 of Figure 2.

In the drawing, reference numeral 10 indicates generally a gate having a frame formed of hollow tubular material such as iron pipes. The gate is hinged at one end to a gate post 11 by means of upper and lower hinges 12 and 13 in a manner to permit the same to be swung horizontally or lifted vertically as will hereinafter be described.

The upper hinge may comprise an eye bolt or staple 14 secured in the post 11 and a similar eye or ring 15 secured to the upright 16 of the frame 10.

The lower hinge 13 comprises an eye bolt or staple 14' secured in the post 11 and a similar eye 17 formed in one end of a cylindrical member 18. The member 18 may be formed of metal pipe having an external diameter corresponding to the internal diameter of the pipe of which the frame 10 is formed. The cylindrical member 18 extends through an opening 19 in the upright portion 16 of the gate frame, and extending transversely through the upright 16 projects into the lower horizontal portion 20 of the frame 10.

The cylindrical member or plunger 18 is provided with a plurality of openings 21 on the upper side thereof, which openings are spaced at short distances along the length thereof, and openings 22 on the lower side thereof, each of said openings 22 being transversely opposed to a corresponding opening 21.

Within the upright portion 16 is a solid cylindrical member 23 providing a weight of such external diameter as to permit it to slide readily within said upright portion. The weight 23 functions as a locking member by having a reduced portion 24 providing a detent at its lower end, which detent is adapted to be received in and project through any pair of opposed openings 21 and 22 in the cylindrical member 18.

At its upper end, the weight 23 is provided with an eye 25 through which is secured a cord or wire 26. The wire 26 extends upwardly through the upright portion 16, thence through the upper horizontal portion 27 of the frame 10, and downwardly through a portion of the upright 28 where its free end is run out through an opening 29.

The construction described in the foregoing permits the gate to swing horizontally in the usual manner, and also permits the unsupported end of the gate to be elevated by the operator. Such elevation is effected by pulling upon the wire 26 to lift the weight 23 for a sufficient distance to remove the reduced end portion 24 from any pair of openings 21 and 22 in which it may be engaged. The gate is then lifted to the desired elevation and the weight released to permit the detent 24 to engage in some other set of openings 21 and 22 farther to the right along the plunger 18. The gate is thus securely held in the adjusted position.

It will be seen that in the event the gate 10 sags toward the unsupported end, the sagging may be compensated by engaging the detent 24 in a set of openings 21 and 22 a short distance to the right of the position shown in Figure 1. Where it is desired to elevate the gate to a position permitting the passage of small animals thereunder while preventing the passage of larger animals, the gate may be lifted and secured in the desired higher elevation, by engaging the element 24 in openings farther along the plunger 18.

It will be understood that the gate may be secured in closed position by any suitable latching means at the unsupported end thereof, which latching means forms no part of the present invention.

As shown the gate frame may conveniently be formed of a single pipe bent to provide the upright and horizontal outer portions of the frame as shown. For convenience in assembly, the lower end of the upright portion 16 is left open as indicated at 30, and constitutes one end of the pipe from which the frame is formed. The end of the lower horizontal portion 20 constituting the other end of said pipe, is welded to the upright 16, as indicated at 31, at the opening therethrough for accommodating the plunger 18. Braces 32 may be welded to the frame so formed to give the same the desired rigidity.

While there has been herein described a preferred embodiment of the invention other embodiments thereof within the scope of the appended claims will be apparent to those skilled in the art from a consideration of the form shown and the teachings herein.

Having described the invention, I claim:

1. An adjustable gate comprising a frame including an upright tubular member open at the lower end and a horizontal member opening at one end in the upright member adjacent said open end, means swingably securing the other end of said upright member to a supporting member, a plunger swingably connected to the supporting member and slidably engageable through said upright member adjacent said one end for telescopic engagement in said horizontal member, said plunger having openings along the length thereof, a weighted member slidable in said upright member, and a projection on said weighted member biased for engagement in a selected one of said openings for securing the gate in selected angular adjusted position relative to the supporting member.

2. An adjustable gate comprising a frame including a vertical tubular member at one end thereof and a horizontal tubular member fixed on one end of said vertical member, means hingedly connecting the other end of said vertical member for horizontal and vertical swinging movement on a supporting member, an element hinged on the supporting member for swinging movement in a horizontal and vertical direction and slidably engageable in said horizontal member, and a weight member slidable in said vertical member biased for engagement with said element for securing said frame in selected angular relation to the supporting member.

3. An adjustable gate comprising a frame including a vertical member and a horizontal member fixed at one end of said vertical member, means hingedly connecting the other end of said vertical member on a supporting member for horizontal and vertical swinging movement, a hinge element hinged on the supporting member for horizontal and vertical swinging movement and engaging said horizontal member for horizontal sliding movement relative thereto, a locking member slidably engaging said vertical member biased for locking engagement with said hinge element for securing the gate in selected angular adjusted position relative to the supporting member.

ELI D. McCULLOUGH.

REFERENCES CITED

The following references are of record in the file of this patent:

UNITED STATES PATENTS

| Number | Name | Date |
|---|---|---|
| 676,429 | Ellis | June 18, 1901 |
| 832,428 | Spilger | Oct. 2, 1906 |
| 1,192,592 | Winter | July 25, 1916 |
| 1,357,108 | Nelson | Oct. 26, 1920 |
| 1,443,446 | Watermann | Jan. 30, 1923 |
| 1,443,467 | Goss et al. | Jan. 30, 1923 |